Figure 1:
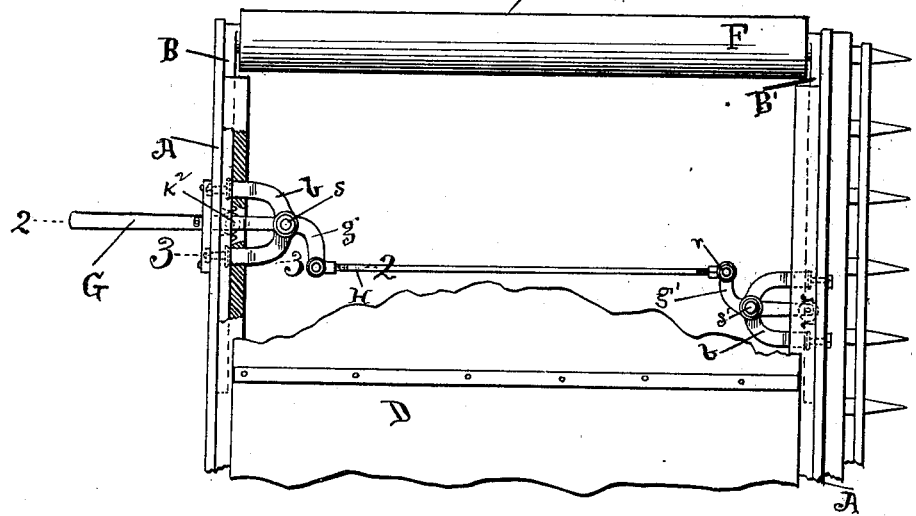

No. 658,081. Patented Sept. 18, 1900.
C. COLAHAN.
BELT TIGHTENER.
(Application filed July 24, 1900.)
(No Model.)

Witnesses
E. B. Gilchrist
M. H. Colahan

Inventor:
Chas Colahan

UNITED STATES PATENT OFFICE.

CHARLES COLAHAN, OF CHICAGO, ILLINOIS.

BELT-TIGHTENER.

SPECIFICATION forming part of Letters Patent No. 658,081, dated September 18, 1900.

Application filed July 24, 1900. Serial No. 24,641. (No model.)

*To all whom it may concern:*

Be it known that I, CHARLES COLAHAN, a citizen of the United States, and a resident of Chicago, county of Cook and State of Illinois, have invented certain new and useful Improvements in Belt-Tighteners for Harvesters, of which the following is a specification, reference being had to the accompanying drawings, forming a part hereof.
This invention relates to improvements in belt-tighteners for harvesters having endless aprons or belts of canvas or other material adapted to run over rollers at each end of the platform or elevator of a harvester. These aprons are affected by atmospheric conditions or damp grain, in which moisture will soften the fiber or material of which the apron is made, and as a consequence it will permit the elongations or stretching of the apron so much that it will become loose on the rollers, which will run in loose contact with the apron, and the roller or apron must be tightened immediately to impart movement to the apron or the harvester will be clogged up with the incoming grain. Thus it will be seen that when the harvester is in operation it is important that convenient and effective means should be within reach of the operator to secure the uninterrupted carrying forward of the grain by the aprons, and in order to properly accomplish this purpose the carrier-roller should be equally and simultaneously adjusted at each journal-bearing at the ends of the roller. I accomplish this adjustment by means of a hand-lever that is pivoted on a fixed supporting-bracket secured to the harvester-platform frame between the aprons. This adjusting-lever is provided with a friction-roller that has a bearing on lugs attached on each side of an aperture in the adjustable supporting-bar in which the apron-roller is journaled, and as this lever is moved by the operator in either direction it will impart a corresponding movement to the adjustable supporting-bar and its apron-roller, it having a connecting cross-rod secured to a coöperating bent lever that actuates the front lever, moving the supporting-bar, in which the apron-roller is journaled at the front of the machine, substantially as shown in my Patent No. 285,464, dated September 25, 1883, of which my present invention is an improvement, and provides means within reach of the operator by which the apron-roller can be quickly moved in either direction and held by the lever being placed in holding-notches at any point of adjustment, a spring retaining it in the notches, or the lever may be released from its holding means, and thus leave the roller and its mechanism free from any pressure on the apron, and when the machine is not in operation or at times when the apron-straps and their buckles are being secured the lever is very convenient to draw the rollers together and enable the straps and buckles to be easily fastened or unfastened, and when fastened the roller may be pressed outwardly to tighten the apron and held as desired.

Figures 2, 3:
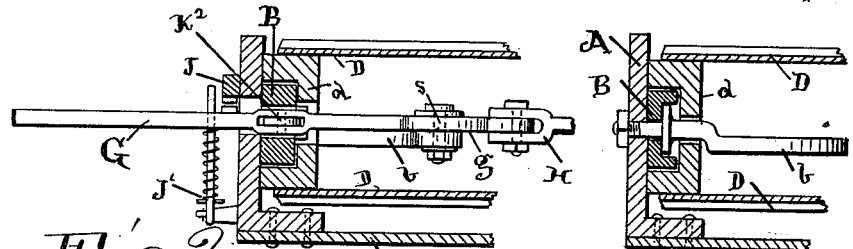
Figure 4:
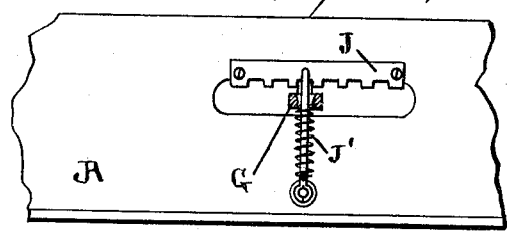
Figures 5, 6:
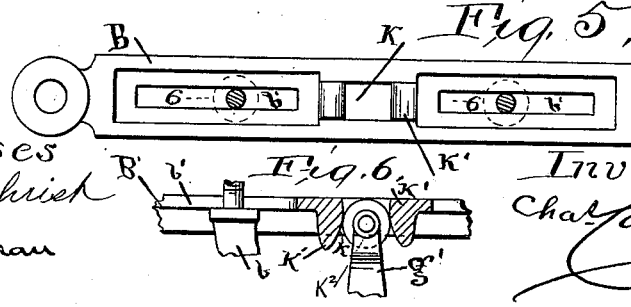

In the drawings the general features of my invention are shown in Figure 1, which is a plan view. Fig. 2 is a vertical section on line 2 2 of Fig. 1, showing the adjusting-lever pivoted to its supporting-bracket, which bracket is secured to the frame, as shown in Fig. 3, which is on line 3 3 of Fig. 1. Fig. 4 is a rear sectional outer view showing the holding-lever extending through the oblong aperture in the rear of the platform, also the lever-notches and retaining-spring; Fig. 5, the adjustable roller-supporting bar and the adjusting-lever socket, also the horizontal holding-apertures through which the arms of the lever-supporting bracket extend to be secured to the frame. These apertures admit the desired movement of the supporting-bar and the adjustable roller that is journaled therein. Fig. 6 is a sectional view of Fig. 5, showing the lever-socket with lever and its frictional roller extending therein, as indicated on line 6 6 of Fig. 5.

As shown in the drawings, A A represent the harvester-frame; B B', the adjustable roller-supporting arms, provided with elongated openings $b'$ $b'$ and maintained in place by the lever-supporting brackets $b$ $b$, that pass through the openings and are secured to the harvester-frame by fastening-nuts. These roller-supporting arms have lever-sockets K, with lugs $k'$ $k'$, against which the friction-roller $K^2$ of the adjusting-lever operate, the apron-roller F being journaled at the outer end in any desired manner.

D D is the apron-carrier, $d$ $d$ its supporting ledges or guides, and E the bottom of the platform, secured to the harvester-frame by rivets.

G is the adjusting-lever, provided with the friction-roll $k^2$, that operates within the socket K to move the roller-supporting arm B. This lever is pivoted to its supporting-bracket at $s$ and provided with an angular extension $g$ beyond its pivot, to which is attached a cross-rod H, that is secured at $r$ to a corresponding angular lever $g'$, that is pivoted to the front bracket at $s'$ and provided with an extension and friction-roll $K^2$, that operates within the socket K of arm B', as shown in Fig. 6. J is a plate having lever-holding notches secured to the frame outside, and J' its retaining-spring, that is mounted on a pivoted rod which bears against the lower side of the lever to retain it in any desired position when placed in its holding-notches.

Having thus described and shown by the drawings my invention, which is inexpensive and simple in its construction and operation, possessing all the elements desired for its purpose, what I claim, and desire to secure by Letters Patent, is—

1. The hand-lever G, pivoted on its supporting-bracket at $s$, and operating within the socket K to move the adjustable roller-supporting arm B, said lever being provided with an angular extension $g$ beyond its pivot, the cross-rod H pivoted at $r$ to the elbow-lever $g'$ imparting a corresponding movement to the adjustable roller-supporting arm B', all said parts combined substantially as shown and described.

2. The combination of the carrier-roller F, the adjusting-arms B B', having the lever-socket K and the elongated apertures $b'$ $b'$ with the securing and lever-supporting brackets $b$ $b$, and the elbow-lever $g'$, connecting cross-rod H, bent lever $g$, its pivot S and the actuating-lever G for adjusting and maintaining the apron-roller in any desired position, substantially as shown and described.

3. The adjusting-lever G, pivoted at $s$, combined with the rear adjusting-arm B, the connecting cross-rod H and elbow-lever $g'$, imparting a simultaneous movement to the arm B' substantially as shown and described.

CHARLES COLAHAN.

Witnesses:
M. H. COLAHAN,
ANNIE HEDGES.